United States Patent [19]
Willmann et al.

[11] Patent Number: 5,112,115
[45] Date of Patent: May 12, 1992

[54] ANTI-SKID BRAKE CONTROL SYSTEM

[75] Inventors: Karl-Heinz Willmann, Freiberg/N; Dietmar Rischen, Korntal-Muenchingen; Wolf-Dieter Jonner, Beilstein Schmidhausen, all of Fed. Rep. of Germany

[73] Assignee: Robert Bosch GmbH, Stuttgart, Fed. Rep. of Germany

[21] Appl. No.: 606,263

[22] Filed: Oct. 31, 1990

[30] Foreign Application Priority Data

Nov. 6, 1989 [DE] Fed. Rep. of Germany ....... 3936851

[51] Int. Cl.$^5$ .............................................. B60T 8/32
[52] U.S. Cl. ............................ 303/114 R; 303/116 R; 303/119 R; 188/358
[58] Field of Search ............ 303/114, 119, 116, 50–56, 303/113, 113 TB, 114 R, 114 PB, 113 R, 116 R, 116 SP, 119 R, 119 SV; 188/358, 359; 60/545, 547

[56] References Cited

U.S. PATENT DOCUMENTS

| | | |
|---|---|---|
| 4,415,210 | 11/1983 | Belart . |
| 4,914,917 | 4/1990 | Schonlau ........................ 303/114 X |
| 4,964,676 | 10/1990 | Resch ............................... 303/114 X |
| 5,027,599 | 7/1991 | Nishii et al. ..................... 303/114 R |
| 5,066,077 | 11/1991 | Farr ................................. 303/114 R |

FOREIGN PATENT DOCUMENTS 3040561 5/1982 Fed. Rep. of Germany .

Primary Examiner—Douglas C. Butler
Attorney, Agent, or Firm—Edwin E. Greigg; Ronald E. Greigg

[57] ABSTRACT

In a known anti-skid control system having a brake booster, a servo piston is followed in the actuating direction by a restoring piston. After a partial stroke, the servo piston can reach the restoring piston and displace it. This arrangement is disadvantageously long. In the brake booster proposed here, a restoring piston is displaceably disposed inside the guide bore. This piston has a bottom and bordering on its a cylinder wall open toward the brake pedal. This wall forms a cylinder jacket in which the servo piston is displaceable. The servo piston executes a part of its working stroke at a variable distance from the bottom of the restoring piston. From the time of contact with the restoring piston, the servo piston executes a further working stroke together with the restoring piston, if necessary.

19 Claims, 1 Drawing Sheet

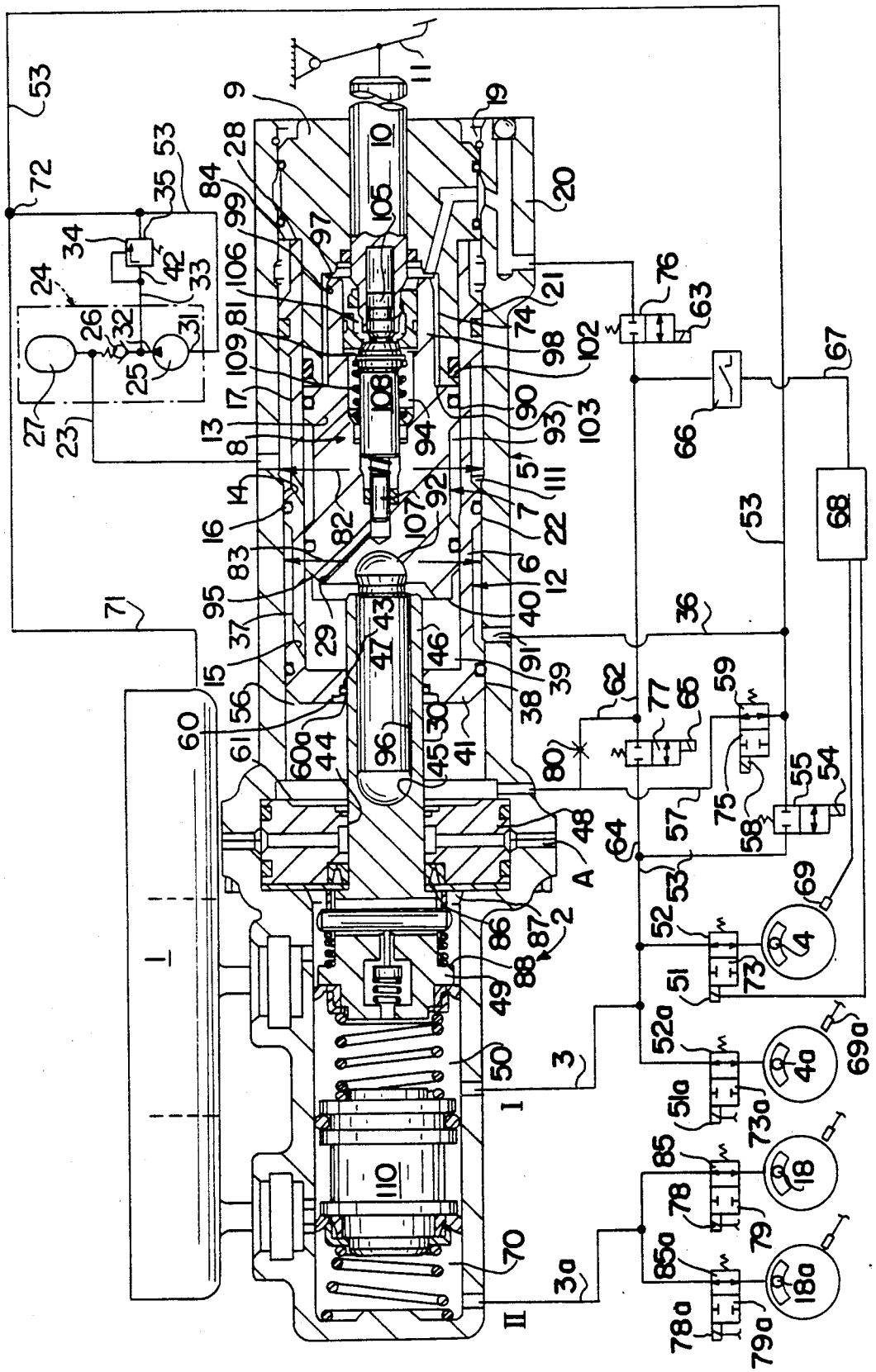

ANTI-SKID BRAKE CONTROL SYSTEM

BACKGROUND OF THE INVENTION

The invention relates to an anti-skid control system as defined hereinafter. An anti-skid control system of this kind is known (German Offenlegungsschrift 30 40 561, FIG. 8). In this known anti-skid control system, a servo piston is disposed in a slide chamber of a brake booster housing. Downstream of the servo piston in the actuation direction is a tube-like restoring piston. When the servo piston executes long motions, the restoring piston is displaced by the servo piston across a stop collar inside an intermediate chamber having a larger diameter. In an anti-skid control situation, hydraulic pressure can be exerted upon an effective surface area of the restoring piston, forcing the restoring piston toward a stop structurally connected to the housing. As a result, beyond a predetermined position, the servo piston is prevented from further displacement in the direction of a buildup of brake pressure, or is moved counter to the pedal force of the driver in the releasing position of a brake pedal. In this process at least one brake circuit chamber of the multi circuit master cylinder connected to the brake booster is supplied with servo pressure fluid from the slide chamber of the servo piston. One disadvantage of the anti-skid control system is that the length and disposition of the tube-like restoring piston require a long installation space, in an extension of the servo piston installation space. This anti-skid control system has the further disadvantage that in the anti-skid control operation, both brake circuits connected to the master brake cylinder must be opened in order to reduce brake pressures. A brake circuit monitor must therefore be provided, along with a safety valve, for example, by which quantities of brake fluid contained in the multi-circuit master cylinder and its brake circuits are prevented from flowing out in the event of failure of one of the pressure fluid sources that supply the anti-skid control system. This is because a defective pressure fluid source is unable to replace amounts of pressure fluid that have drained out.

OBJECT AND SUMMARY OF THE INVENTION

The anti-skid control system according to the invention has the advantage of a restoring piston, in the form of the bottom of an outer cylinder jacket, that is shorter than that of the prior art; the cylinder jacket encompasses the servo piston and can be moved in coupled fashion with it. The structural length is thus shortened markedly, and the design is more advantageous. Another advantage is reduced friction wear at the seals of the servo piston. This advantage is attained because the displacement paths of the servo piston inside the restoring piston are shorter than the longest possible displacement path of the next master cylinder piston in succession. Once the servo piston strikes the bottom of the restoring piston, the restoring piston is displaced; the servo piston rests inside the restoring piston.

A particularly advantageous feature is that first valve assemblies comprising 2/2-way magnetic valves are formed, which in the event of anti-skid control can individually, or together with a single third valve assembly, effect a pressure reduction at wheel brake cylinders in one brake circuit or at wheel brake cylinders in two brake circuits, and therefore entail less expense for valve assemblies at wheel brake cylinders than in the prior art.

Another advantageous feature is a switch that is responsive to pressure and takes into account the end of a brake actuation in the anti-skid control situation the switch is located between a pilot pressure chamber inside the brake booster slide chamber and the first valve assemblies and in this case effects a triggering of the first valve assemblies. As a result, both the regulated pressure between the first valve assemblies and the wheel brake cylinders and the brake pressure in the multi-circuit master cylinder drop. By providing a line connection between the pilot pressure chamber and the first brake circuit, a faster pressure buildup in the first and second brake circuits is obtained during a brake pressure modulation in the wheel brake cylinders.

Since one of the two brake circuits is a so-called closed brake circuit and has no direct communication with the source of pressure fluid, a leakage or brake circuit monitor is unnecessary.

The invention will be better understood and further objects and advantages thereof will become more apparent from the ensuing detailed description of a preferred embodiment taken in conjunction with the drawing.

BRIEF DESCRIPTION OF THE DRAWING

The single figure of the drawing shows an exemplary embodiment of the invention.

DESCRIPTION OF THE PREFERRED EMBODIMENT

An anti-skid control system for vehicles as shown in the drawing has pressure fluid tank 1 for brake fluid and a multi-circuit master cylinder 2 of a known type. Brake lines 3; 3a originate at this master brake cylinder, each at a different brake circuit chamber 50; 70 and each leading to one anti-skid-controlled wheel brake cylinder 4, 4a; 18, 18a, respectively, per brake circuit.

The master cylinder 2 is constructed of a pair of generally tubular members which are provided with smooth juxtaposed surfaces. These abutting surfaces are interrupted with at least a pair of opposed recessed areas which in assembly of the tubular members can thereby provide threaded grooves A. A portion of one of a series of a bolt means which fastens the tubular members together are spaced apart circumferentially relative to the grooves A, as shown.

The multi-circuit master cylinder 2 is actuated by a hydraulic brake booster 5. A cup-shaped restoring piston 12 is disposed in a guide bore 19 in the hydraulic brake booster 5, which has a housing 20. The restoring piston has a tubular cylinder wall 6, which encompasses a slide chamber 93 in the form of a blind bore, and also has a bottom 41. The restoring piston 12 has an end face 28 on one end toward a brake pedal II; in the outset position of the restoring piston 12, the brake pedal rests on an opposite stop face 84 of a housing part 9 fixedly inserted in the housing 20. The slide chamber 93 in the form of a blind bore is open toward the end face 28. A servo piston 7 protrudes into the slide chamber 93 and there is supported over a portion of its length by an outer cylinder jacket 90. The servo piston 7 receives a follower valve assembly 8. Between the follower valve assembly 8 and the brake pedal 11 is an actuating rod 10 which is movably guided in the housing part 9 and is sealed off from it.

The follower valve assembly 8 is embodied as a brake valve 81, which in the unactuated state of the brake pedal 11 blocks a hydraulic communication between a pressure fluid source 24 and a pilot pressure chamber 74 located between the servo piston 7 and the housing part 9. A pressure fluid chamber 94 is connected upstream of the brake valve 81. This chamber communicates by means of a conduit 13 guided through the servo piston 7 with a groove 16, which is machined into the servo piston 7 and is open toward a slide chamber 93. Via a passage 14 that penetrates the wall of the restoring piston 12, the slide chamber 93 communicates with a first groove 17 of the restoring piston 12, which piston encompasses the servo piston 7. The first groove 17 of the restoring piston 12 is open toward the guide bore 19 encompassing the restoring piston 12 of the housing 20 of the brake booster 5. In the direction toward the brake pedal 11, the first groove 17 of the restoring piston 12, which is open toward the guide bore 19 is defined by a radially extending step having a first running face 21 and in the opposite direction is defined by a radially extending step having a third running face 22. The first groove 17 communicates with a line segment 23 that is connected to the source 24 of pressure fluid.

The pressure fluid source 24 comprises a self-aspirating pump 25, a retention valve 26, and a pressure fluid reservoir 27. The self-aspirating pump communicates with the pressure fluid tank 1 via an inlet side 31. The check valve 26, which opens toward the first groove 17 of the restoring piston 12 is connected to one outlet side 32 of the self-aspirating pump 25, and the pressure fluid reservoir 27 is connected to a line leading onward from the retention valve 26. A line segment 33 that leads to one inlet 42 of an overpressure valve 34 is connected between the outlet side 32 of the self-aspirating pump 25 and the retention valve 26. An outlet 35 of the overpressure valve 34 communicates with a relief line 53, leading to the inlet side 31 of the self-aspirating pump 25 and also connected, a connection point 72 and a line segment 71, to the pressure fluid tank 1.

The second relief line 53 can be connected, via a third valve assembly 54, to first valve assemblies 51, 51a of the first brake circuit I. The first brake circuit I begins at the first brake circuit chamber 50.

A first relief line 36 communicates with a second groove 37 of the restoring piston 12, which is spaced apart from the first groove 17 and offset from it in the actuating direction, through a passage 91 in the wall of the housing 20. The relief line 36 is connected to the second relief line 53 between the connection point 7 and the third valve assembly 54. The second groove 37, open toward the guide bore 19, is defined on the one hand by radially extending step having the third running face 22 and on the other by a radially extending step having a second running face 38. The running faces 21, 22, 38 face toward the guide bore 19 that encompasses them. Sealing rings are located next to the running faces 21, 22, 38.

The second groove 37 is connected, via a further passage 5 located in the wall of the restoring piston 12, with an intermediate chamber 39 formed in the slide chamber 93 between the end face 40 of the servo piston 7 and the bottom 41 of the restoring piston 12. A further relief line 29 leads into the intermediate chamber 39; it extends downstream of the follower valve assembly 8 through the servo piston 7 and discharges into the intermediate chamber 39 by an outlet 95. The center of the bottom 41 of the restoring piston 12 is provided with a cylindrical opening 43 that penetrates the bottom 41 and extends as far as a spaced-apart shoulder face 60 of the restoring piston 12. A sealing ring 60a is installed in the bottom 41 between the opening 43 and the shoulder face 60.

A piston rod 46 which begins a the multi-circuit master cylinder 2, is guided in a sealed manner in the opening 43 of the restoring piston 12, and protrudes into the intermediate chamber 39. Beginning at an end protruding into the intermediate chamber 39, the piston rod 46 is provided with a formed-in guide bore 96 and an adjoining spherical indentation 45. A toggle link 47 plunges into the spherical indentation 45 and is supported by its opposite end in a second spherical depression 92, located in the servo piston 7. Toward the multi-circuit master cylinder 2, the piston rod 46 protrudes through an adjusting chamber 56 that adjoins the shoulder face 60 of the restoring piston 12 and is supported in an axially movable and sealed manner in a bearing bore 44 of a separator device 48 which is located between the brake booster 5 and the multi-circuit master cylinder 2. In the position of repose, with a first step 86 beginning at a piston rod jacket face 30, the piston rod 46 rests on an end face 87 of the separator 48 oriented toward the multi-circuit master cylinder 2. A second step 88, attached to the piston rod 46 in a spaced-apart manner in the actuating direction and having a larger diameter, forms a first piston 49 of the multi-circuit master cylinder 2. The first brake circuit chamber 50 adjoins the first piston 49 in the actuating direction. The first brake circuit chamber 50 communicates via the brake line 3 with the first valve assemblies 51, 51a, which in the through position 52, 52a establish communication between the first brake circuit chamber 50 and the wheel brake cylinders 4, 4a.

Between the first brake circuit chamber 50 of the multi-circuit master cylinder 2 and the first valve assemblies 51, 51a, the relief line 53, which extends in the direction of the pressure fluid tank 1 and the inlet side 31 of the self-aspirating pump 25, is connected to the brake line 3. The third valve assembly 54, which in the non-controlled state is closed, is disposed in the relief line 53.

A line segment 57 originating at the adjusting chamber 56 leads to a segment of the relief line 53 located between the third valve assembly 54 and the pressure fluid tank 1. A fourth valve assembly 58, which normally assumes a through position 59, is disposed in the line segment 57.

The adjusting chamber 56 is formed inside the guide bore 19 of the brake booster 5, between the bottom 41 of the restoring piston 12 and the axially spaced apart separator 48.

Adjoining the line segment 57 between the adjusting chamber 56 and the fourth valve assembly 58 is a line 62 that can be connected to the pilot pressure chamber 74 via the second valve assembly 63. In the anti-skid control situation the second valve assembly 63 can be opened, so that pressure from the pilot pressure chamber 74 can reach the adjusting chamber 56 through the line 62. The fourth valve assembly 58 is also switched to a pressure holding position 75 in the anti-skid control situation. A flow throttle 80 is inserted into the line 62 between the second valve assembly 63 and the adjusting chamber 56. A fifth valve assembly 65 is connected to the line 62 between the second valve assembly 63 and the flow throttle 80. Beginning at the fifth valve assembly 65, a line segment 64 leads to the relief line 53, which communicates with the first valve assemblies 51, 51a and the third valve assembly 54. In the anti-skid control situation, the fifth valve assembly 65 can be moved into a switched through position 77, to connect the first brake circuit chamber 50 with both the adjusting chamber 56 and the pilot pressure chamber 74. In the basic position of the servo piston 7, the pilot pressure chamber 74 begins at a bearing face 102 of the servo piston 7 and extends toward the brake pedal 11 between blind bore 99 in the housing part 9 and a step 98 of the servo piston 7.

In the brake actuation situation, the pilot pressure chamber 74 is lengthened in the axial direction, because the servo piston 7, with its bearing face 102, is moving away from a stop face 103 located toward the face end of the housing part 9. The follower valve assembly 8 disposed inside the servo piston 7 can for instance be found in the prior art and can be triggered by the actuating rod 10 connected to the brake pedal 11, in order to feed pilot pressure into the pilot pressure chamber. After a short actuating stroke, an element 105 for instance inserted into the actuating rod 10 and guided axially, closes a subchamber 106 of the further relief line 29 communicating with the pressure fluid tank 1, the subchamber being formed downstream of the brake valve 1 and communicating with the pilot pressure chamber 74.

If the element 105 is moved onward, i.e., to the left as viewed in the drawing then it cooperates with a valve element 107 which is oriented in the actuating direction, in such a way that a valve piston 108, encompassing the valve element 107 and at the same time resting on the valve element 107 in the direction of the brake pedal 11, is moved in coupled fashion in the opening direction of the brake valve 81, counter to a compression spring 109. A pressure fluid that is at operating pressure in the pressure fluid chamber 94 can thus reach the downstream pilot pressure chamber 74 via the opened brake valve 81 and can build up a pressure in this chamber. By an end 97 of the servo piston 7 oriented toward the brake pedal 11, this pressure generates a force that sets the servo piston 7 into motion in the operating direction.

Between the second valve assembly 6 and the fifth valve assembly 65 an electric switch 66 that responds to pressure is connected to a connection that is open in the anti-skid control situation and is located between the pilot pressure chamber 74 and the first valve assemblies 51, 51a. The switch 66 is connected to a control unit 68 via an electric line 67. The control unit 68 is also connected to at least one sensor 69, 69a on at least one wheel, which sensor converts wheel rotations into signals. Connections also extends from the control unit 68 to at least the valve assemblies 51, 51a and 78, 78a.

If there is no danger of wheel locking, the mode of operation of the brake system remains unaffected by the valve assemblies or restoring piston 12. If one of the wheels, or several simultaneously, are tending to block, then signals are emitted in a characteristic sequence by the sensors 69, 69a associated with the wheels and reach the electronic control unit 68, which then electromagnetically controls the first valve assemblies 51, 51a; 78, 78a and switches them into second positions 73, 73a; 79, 79a for holding the pressure or into through positions 52, 52a; 85, 85a, and switches the third valve assembly 54, which is open in the direction of the pressure fluid tank 1, into a pressure-reducing position; the pressure modulations that overcome the danger of locking are generates in the wheel brake cylinders 4, 4a; 18, 18a. For the wheel brake cylinder 4, during a possibly necessary pressure holding phase, one first valve assembly 51 switches into the second position 73, and the other first valve assembly 51a will possibly be able to remain in the through position 52. If the hydraulic pressure in the wheel brake cylinder 4 should subsequently be reduced, then the one first valve assembly 51 is switched into the through position 52, and the other first valve assembly 51a is switched into the second position 73a. At the same time the third valve assembly 54 is switched into the through position 55; the fourth valve assembly 58 is switched into the blocking position 75; and the second valve assembly 63 is switched into a through position 76. A pressure fluid that is at hydraulic pressure can then flow out of the pilot pressure chamber 74, which communicates with the pressure fluid source 24 via the brake valve 81, into the adjusting chamber 56. During this process, the hydraulic pressure in the adjusting chamber 56 will build up in the direction of the shoulder face 60 of the restoring piston 12 and generate a displacement force. The displacement force, acting in the direction of the releasing position of the brake pedal 11, will move the restoring piston 12 toward the servo piston 7, i.e., toward the right in the drawing and in the event that its bottom 41 strikes the end face 40 of the servo piston 7 will make a motion of the brake pedal 11 in the pressure buildup direction impossible. The brake pedal 11 may possibly have moved some distance toward its outset position. In any case, in the anti-skid mode, a pressure initially present in the first brake circuit chamber 50 can be lowered by means of the control unit 68, with the aid of the third valve assembly 54, by draining pressure fluid into the pressure fluid tank 1.

Connections, leading through the brake line 3a and the first valve assemblies 78, 78a, to the attached wheel brake cylinders 18, 18a are established by the second brake circuit chamber 70, disposed in the multi-circuit master cylinder 2 and separated from the first brake circuit chamber 50 by a second piston 110. These connections, originating at the second brake circuit chamber 70, are designated as the second brake circuit II. In contrast to the brake line 3, which in the anti-skid control situation can be made to communicate with the pressure fluid tank 1, the brake line 2a cannot be made to communicate with the pressure fluid tank 1. Accordingly, brake fluid cannot be drained out of the brake circuit II.

For instance, if pressure modulation becomes necessary for one wheel brake cylinder is of the second brake circuit II, then one first valve assembly 78 will be switched into the second position 79 during the pressure holding phase. During this time, brake pressure can continue to be built up in the other wheel brake cylinder 18a of the second brake circuit, as long as no pressure buildup is necessary at least one wheel brake cylinder 4, 4a of the first brake circuit I.

If a pressure decrease becomes necessary in one wheel brake cylinder 18 of the second brake circuit II, then the first valve assemblies 51, 51a of the first brake circuit I are switched to the second positions 73, 73a. The brake pressure in the first brake circuit chamber 50 and hence the brake pressure in the second circuit chamber 70 as well are now influenced, by means of the second valve assembly 63 switched to the through position 76 and the fourth valve assembly 58 switched to the holding position 75, in such a manner that via the communication established between the pilot pressure chamber 74 and the adjusting chamber 56, a hydraulic pressure builds up in the adjusting chamber 56 that generates a displacement force against the shoulder face 60 of the restoring piston 12 in the direction of the releasing position of the brake pedal 11 and optionally presses the restoring piston 12 against the servo piston 7 in the manner described above, as long as the servo piston has previously been displaced far enough toward the bottom 41 of the restoring piston 12. A reduction of brake pressure in the first brake circuit chamber 50 causes a reduction of brake pressure both in the second brake circuit chamber 70 and in the associated brake circuit II, at least in the region of its brake line 3a. Depending on the switching positions of the valve assemblies 78, 78a determined by the control unit 68, the brake pressure reduction in the wheel brake cylinders 18, 18a has a variable effect.

If an ensuing rapid pressure buildup in the wheel brake cylinders becomes necessary, then the valve assembly 54 is closed, and the fifth valve assembly 65 is switched to the through position 77. Pressure fluid can thus flow directly from the pilot pressure chamber 74 into the first brake circuit I and to both the wheel brake cylinders 4, 4a and the brake circuit chamber 50. This assures a rapid pressure buildup in the first brake circuit chamber 50 and an attendant rapid brake pressure buildup in the second brake circuit chamber 70.

If the second brake circuit II should fail, an ongoing pressure modulation at the wheel brake cylinders of the first brake circuit I need not be interrupted, since the second brake circuit II has no connections with the pilot pressure chamber 74, which can be connected to the pressure fluid source 24, or the pressureless pressure fluid tank 1. Monitoring of the second brake circuit for leakage with the aid of the control unit 68 is accordingly unnecessary.

The valve assemblies 51, 51a; 78, 78a; 63; 54; are embodied as 2/2-way magnetic valves.

A stepwise course of the guide bore 19 is obtained by means of a step 111 on the guide bore 19, located between the third running face 22 and the first running face 21 of the restoring piston 12; as a result, a first guide diameter 82 of the first running face 21 and a slightly smaller second guide diameter 83 are assigned to the second and third running faces 38 and 22, respectively. In the region of the first groove 17 of the restoring piston 12, the pressure of the pressure fluid force 24 therefore generates a force in the direction of the brake pedal 11. While the pump 25 is switched off, the pressure fluid reservoir 27 furnishes the hydraulic pressure required for generating pressure force. In the unactuated state of the anti-skid control system, the restoring piston 12 is as a result pressed against the stop face 84, structurally connected to the housing, of the housing part 9, without the aid of a compression spring.

During a braking operation without the anti-skid control function, the servo piston 7 is displaced. It may possibly strike the bottom 41 of the restoring piston 12 and move the restoring piston 12 toward the multi-circuit master cylinder 2. During normal braking, the adjusting chamber 56 communicates with the pressure fluid tank 1, through the open fourth valve assembly 58. The intermediate chamber 39 communicates permanently with the pressure fluid tank 1.

If the driver lessens the force of his or her foot on the brake pedal 11 during an anti-skid control situation, in such a way that the hydraulic pressure in the pilot pressure chamber 74 and the adjoining line connection through the second valve assembly 63 drops, then this information is passed to the electronic control unit 68 by the switch 66 disposed in the line connection. By means of a signal, the control unit will trigger at least one first valve assembly 51, 51a; 78, 78a and move it into a pressure reduction position in the direction of the pressure fluid tank 1. The pressure wheel brakes cylinders 4, 4a; 18, 18a are pressure-relieved in this process. The switch 66 is for instance embodied in such a way that it responds to a pressure exceeding 10 bar.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An anti-skid control system for vehicles, with anti-skid controlled wheels, each wheel having a wheel brake control means that is supplied with bake pressure from a multi-circuit master cylinder (2) via at least one brake line (3, 3a), at least one valve assembly located in the at least one brake line and connected with at least one of the wheel brake control means of the anti-skid-controlled wheels, said at least one valve assembly assumes switching positions for at least pressure buildup and pressure reduction at least one wheel brake cylinder in the anti-skid control situation, said master cylinder including a pair of tubular members having smooth surfaces, at least one servo piston (7) including a follower valve assembly (8) operable in a cup-shaped restoring piston (12) in at least one of said tubular members, said at least one servo piston being displaceably supported in a slide chamber (93) which defines a pilot pressure chamber (74) that is pressure relieved toward a pressure fluid tank (1) by means of the follower valve assembly and is connected to a pressure fluid source (24) via a pressure line (23), an intermediate chamber (39) bordering the servo piston and located in the slide chamber (93), said cup-shaped restoring piston (12) is operative with the servo piston (7) supported in an adjusting chamber (56), said cup-shaped restoring piston is acted upon with pressure fluid counter to a brake applying operative direction of the servo piston in the anti-skid control situation, for case-by-case limitation of a displacement path of the servo piston in a brake applying direction of the multi-circuit master cylinder as well as for displacement of the at least one servo piston toward an outset position in which the slide chamber (93) is formed inside the cup-shaped restoring piston (12), said cup-shaped restoring piston (12) is embodied with a cylnder wall (6) and a bottom (41), and that said cylinder wall (6) guidingly encompasses the servo piston (7) and in turn said cup-shaped restoring piston is dispaceably supported in a guide bore (19).

2. An anti-skid control system as defined by claim 1, in which the cylnder wall (6) of the cup-shaped restoring piston (12) has a first groove (17), open toward the guide bore (19), and a second groove (37), axially spaced apart from said first groove (17) and open toward the guide bore (19), said first groove (17) being located in a first connection between the follower valve assembly (8) and the pressure fluid source (24), and the second groove (37) being located in a second connection between a first relief line (29) of the follower valve assembly (8) and the pressure fluid tank (1).

3. An anti-skid control system as defined by claim 2, in which said at least one brake line includes a first brake line (3), and said at least one valve assembly includes first and second control valves (51) and (51a), a second relief line (53) begins at the first brake line (3) between the first and second control valves (51) and (51a) and a first brake circuit chamber (50) of a first brake circuit is connected, via a third control valve (654) and arranged to be opened for brake pressure reduction, at least to the pressure fluid tank (1) of the pressure fluid source (24).

4. An anti-skid control system as defined by claim 2, in which a first running face (21) of said cup-shaped restoring piston is associated with the first groove (17) of the cup-shaped restoring piston (12) in a direction of an open end of said master cylinder, and a second running face (38) of said cup-shaped restoring piston (12) disposed in a region of the bottom (41) of said cup-shaped restoring piston (12) juxtaposed the second groove (37), and further that a third running face (22) of said cup-shaped restoring piston (12) is disposed between the first and second grooves (17 and 37), respectively, and that each said running face (21, 22, 38) is located inside the guide bore (19).

5. An anti-skid control system as defined by claim 4, in which the first running face (21) of the cup-shaped restoring piston (12) is formed with a first guide diameter (82), and the second and third running faces (38 and 22), of the cup-shaped restoring piston (12) respectively are formed with a second guide diameter (83), and that the first guide diameter (82) is slightly larger than the second guide diameter (83).

6. An anti-skid control system as defined by claim 5, in which the cup-shaped restoring piston (12) in a region of the first groove (17) is exposed to a pressure of the pressure fluid source (24), which urges the cup-shaped restoring piston (12) toward a brake pedal (11) and in a position of repose of said cup-shaped restoring piston presses said cup-shaped restoring piston (12) against a stop face (84).

7. An anti-skid control system as defined by claim 1, in which said at least one brake line includes a first brake line (3), and said at least one valve assembly includes first and second control valves (51) and (51a), a second relief line (53) begins at the first brake line (3) between the first and second control valves (51) and (51a) and a first brake circuit chamber (50) of a first brake circuit is connected via a third control valve (54) and arranged to be opened for brake pressure reduction, at least to the pressure fluid tank (1) of the pressure fluid source (24).

8. An anti-skid control system as defined by claim 7, in which a second brake circuit is provided, which contains a second brake circuit chamber (70) adjoining the first brake circuit chamber (50) in a braking actuating direction with said first and second brake circuit chambers (50, 70) being partitioned off from one another by a displaceable piston (110); and further that pressure in the second brake circuit is controllable by means of the third control valve (54).

9. An anti-skid control system as defined by claim 7, in which the second relief line (53) leads downstream of the third control valve (54) to an inlet side (31) of a self-aspirating pump (25) of the pressure fluid source (24).

10. An anti-skid control system as defined by claim 9, in which the third control valve (54) is opened in an anti-skid control situation.

11. An anti-skid control system as defined by claim 7, in which the intermediate chamber (39) is separated from the adjusting chamber (56) by the bottom (41) of the restoring piston (12), and further that the adjusting chamber (56) is pressure-relieved via a fourth control valve (58) that is open in an unactuated state.

12. An anti-skid control system as defined by claim 11, in which the adjusting chamber (56) is made to communicate with the pilot pressure chamber (74) via a fifth control valve (64), which is closed in an unactuated state; that a sixth control valve (65), which is closed in an unactuated state, is connected on an outlet side to the fifth control valve (63), and also communicates with the first brake line (3) of the first brake circuit between the first brake circuit chamber (50) and the first and second control valves (51) and (51a); and further that the sixth control valve (65), in an anti-skid control situation, is opened toward the first and second control valves (51) and (51a) ion order to pin crease the brake pressure.

13. An anti-skid control system as defined by claim 12, in which a flow throttle (80) is disposed between the fifth valve assembly (63) and the adjusting chamber (56).

14. An anti-skid control system as defined y claim 12, in which a pressure-sensitive switch (66), which in an anti-skid control situation sends a signal representative of a reduction of hydraulic pressure to an electronic control unit (68), in such a manner that the control unit thereupon controls said at lest one valve assembly (51, 51a; 78, 78a) to a pressure reducing position, said pressure sensitive switch (66) being connected between the pilot pressure chamber (74) and the sixth control valve (65).

15. An anti-skid control system as defined by claim 12, in which in an anti-skid control situation, the fifth control valve (63) and sixth control valve (65) are each switched into a respective through position (76, 77), and further that the fourth control valve (58) is switched into a blocking position (75), in order to introduce pressure fluid from the pilot chamber (74) into the first brake circuit.

16. An anti-skid control system as defined by claim 15, in which the fifth control system (63), the third control valve (54), the fourth control valve (58), and the sixth control valve (65) each comprise one 2/2-way magnetic valve.

17. An anti-skid control system as defined by claim 7, in which the third control valve (54) is opened in an anti-skid control situation.

18. An anti-skid control system as defined by claim 1, in which said at least one valve assembly (51, 51a; 78, 78a) is associated with each wheel brake control means (4, 4a; 18, 18a); that said at least one valve assembly comprises a plurality of 2/2-way magnetic valves; that said plurality of 2/2-way magnetic valves are individually triggerably in such a manner that both pressure reduction and pressure holding, and pressure buildup and pressure holding is performed separately from one another per wheel brake control means (4, 4a, 18, 18a) per brake circuit.

19. An anti-skid control system as defined by claim 1, in which the servo piston (7), in a normal position, is spaced apart from the bottom (41) of the restoring piston (12) by a distance that is shorter that a longest possible useful stroke of the servo piston (7).

* * * * *